United States Patent [19]
Mori

[11] 3,739,770
[45] June 19, 1973

[54] BENDABLE TUBE OF AN ENDOSCOPE

[75] Inventor: Toshiyuki Mori, Minamitama-gun, Tokyo, Japan

[73] Assignee: Olympus Optical Co., Ltd., Tokyo, Japan

[22] Filed: Oct. 6, 1971

[21] Appl. No.: 186,979

[30] Foreign Application Priority Data
Oct. 9, 1970  Japan.............................. 45/100982

[52] U.S. Cl..................................... 128/6, 138/130
[51] Int. Cl........................... A61b 1/00, F16l 11/08
[58] Field of Search.......................... 128/6; 138/130

[56] References Cited
UNITED STATES PATENTS
779,374   1/1905   Phillips ........................... 138/130 X
2,975,785   3/1961   Sheldon ................................... 128/6
3,100,482   8/1963   Hett....................................... 128/6
3,190,286   6/1965   Stokes..................................... 128/6

*Primary Examiner*—Channing L. Pace
*Attorney*—Hans Berman

[57] ABSTRACT

A bendable tube portion in an endoscope comprises two helically wound metal strips, one of which closely surrounds the other. The strips are wound in opposite directions and the turns of one strip are secured to corresponding turns of the other strip in the plane of bending motion of the tube portion. The tube portion may be bent by at least one string extending through the tube and connected to a control mechanism in the control housing of the endoscope.

3 Claims, 2 Drawing Figures

Patented June 19, 1973

3,739,770

INVENTOR
Toshiyuki Mori
BY Kelman and Berman
AGENTS

BENDABLE TUBE OF AN ENDOSCOPE

BACKGROUND OF THE INVENTION

The present invention relates to endoscopes, and particularly to a bendable tube portion in an endoscope.

An endoscope is normally provided with a distal end casing adapted to be inserted into a body cavity and having an observation/photographing window, an illuminating window and an objective lens located therein, a control housing having an eyepiece or a photographing device and a manually operable control mechanism located therein, and a tube having a controllably bendable portion and a pliable portion connects the distal end casing to the control housing. An image transmitting fiber optical system and a light conducting fiber optical system extend through the tube for illuminating the object to be viewed by means of a light source connected to the proximal end of the light conducting fiber optical system and for transmitting an image of the object to the eyepiece or the photographing device. At least one string which extends through the tube has its distal end secured to the distal end of the bendable tube portion and its proximal end secured to the control mechanism so that the tube may be bent by means of the control mechanism and the string. A forceps inserting tube, water supplying tube, air supplying tube and other various conduits may extend through the tube during operation of the endoscope. Therefore, the inner diameter of the bendable tube portion should be as great as possible to provide sufficient space for the various elements, while the outer diameter must be kept to a minimum so that the endoscope may be used for inspecting the lung, the brain, the heart, or the kidney of a living body, the passages leading to these organs being extremely narrow.

In a known, relatively thin walled, bendable tube portion of an endoscope, short annular segments are flexibly joined to each other and covered with several protecting layers surrounding the segments. Such a construction is very complicated and the wall thickness is still relatively great, while the assembly of such segments is very troublesome.

SUMMARY OF THE INVENTION

An object of the present invention is to provide a bendable tube portion in an endoscope which avoids the abovedescribed disadvantages of the prior art.

Another object is to provide an endoscope with a bendable tube portion of the type described above which is simple in construction and has a very thin wall.

The above object is achieved in accordance with the present invention by providing a bendable tube portion with at least two helically wound strips, one strip closely surrounding the other, and the direction of winding of the strips being opposite to each other, each turn of one strip being secured to a corresponding turn of the other strip in the plane of bending of the tube portion. The thus formed bendable tube portion has a very thin wall and still has appropriate mechanical properties for the intended use. The strips may be covered by a thin, flexible, water-tight sheath as is usual in the art.

DETAILED DESCRIPTION OF THE PREFERRED EMBODIMENT

Figure 1:
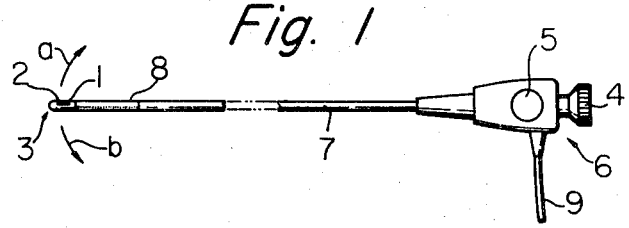
FIG. 1 is a side view of an endoscope incorporating the bendable tube portion in accordance with the present invention.

Referring to FIG. 1, the endoscope comprises a distal end casing 3, a controllably bendable tube portion 8 connected to the casing 3, a pliable tube portion 7 connected to the tube portion 8, and a control housing 6 connected to the proximal end of the tube portion 7. The distal end casing 3 is provided with an observation/photographing window 1 and an illuminating window 2 in its cylindrical wall and houses therein an objective lens (not shown) for forming an image of an object to be inspected through the observation/photographing window 1. An image transmitting fiber optical system (not shown) extends through the tube from the objective lens to an eyepiece 4 provided in the control housing 6 or a photographing device (not shown). In order to illuminate the object, a light conducting fiber optical system (not shown) extends through the tube and beyond the control casing 6 through a further flexible tube 9 connected to an external light source (not shown) so that the light from the light source is transmitted through the illuminating window 2.

A control mechanism (not shown) operated by a knob 5 is housed in the control housing 6. At least one string extends through the flexible tube portion 7, and the distal end thereof is secured to the distal end of the bendable tube portion 8 while the proximal end of the string is connected to the control mechanism so that, upon actuation of the knob 5, the string is pulled or pushed so as to bend the tube portion 8 in a plane indicated by the arrows a, b.

Preferably, two strings are attached to the tube portion 8 at positions diametrically opposite to each other in the plane of bending and are pulled alternately by the control mechanism.

Figure 2:
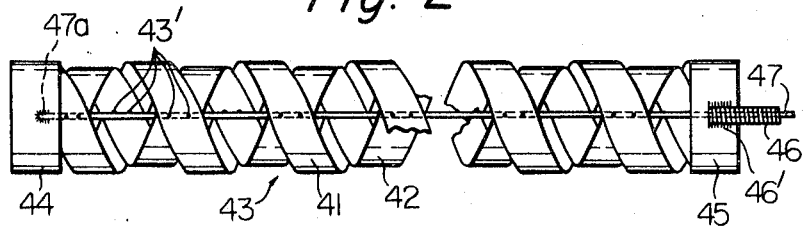
FIG. 2 is a side view of the bendable tube portion of the endoscope of FIG. 1, the protecting sheath being omitted.

The controllably bendable tube portion 43 shown in FIG. 2 comprises two wall layers 41, 42 each made of a helically wound strip of strong and resilient metal, the strip 41 closely surrounding the strip 42. The direction of the helical winding of the strip 41 is opposite to that of the strip 42.

Each turn of the strip 41 is secured to the corresponding turn of the strip 42 by means of spot welds 43′ in the plane of bending of the tube, i.e., in the plane passing through the axis of the tube and perpendicular to the plane of FIG. 2 on both sides of the tube portion 43.

The distal and proximal ends of the strips 41, 42 are secured by annular elements 44, 45 to the distal end casing 3 and the flexible tube portion 7, respectively.

A string 47 extends through the tube portion 43 and the flexible tube portion 7 in the plane of bending of the tube portion 43 and the distal end 47a of the string 47 is secured to the annular element 44 while the proximal end is connected to the control mechanism in the control housing in a manner not shown.

A closely wound coil 46 slidably surrounds the string 47, and the distal end 46′ of the coil 46 is secured to the element 45 while the non-illustrated proximal end is secured to a stationary portion of the control mechanism so that the string 47 is pulled or pushed for bending the tube portion 43.

The bendable tube portion as described above is very simple in construction and easy to manufacture and still has appropriate flexibility suitable for use in an endoscope without buckling.

A minimum number of covering layers (not shown) suffices to effectively protect the bendable tube portion without affecting its mechanical properties. Thus, the outer diameter of the bendable tube portion is held to a minimum which is particularly advantageous in the inspection of the lung, the brain, the heart, or the kidney, while sufficient space is maintained within the bendable tube portion for housing therein various elements of the endoscope.

What is claimed is:

1. In an endoscope including an elongated tube, and end casing and a control housing on respective longitudinal ends of said tube, and a control mechanism on said housing, a longitudinal portion of said tube adjacent said end casing being bendable, and said control mechanism including means for bending said portion in a plane longitudinal of said tube, the improvement in said bendable tube portion which comprises:

a. an inner strip;
b. an outer strip,
   1. said strips being helically wound in opposite directions to constitute a plurality of turns about an axis extending longitudinally of said portion,
   2. said outer strip closely enveloping said inner strip; and
c. securing means located in said plane and securing each turn of one of said strips to a respective turn of the other strip.

2. In an endoscope as set forth in claim 1, said securing means securing respective turns of said inner strip located in said plane on opposite sides of said axis to respective turns of said outer strip located in said plane on said opposite sides.

3. In an endoscope as set forth in claim 1, said strips having each two longitudinally terminal portions, and said control mechanism including an elongated control member secured to each of the terminal portions of said strips adjacent said end casing and extending therefrom through said tube to said control housing.

* * * * *